(12) United States Patent
Cochran (10) Patent No.: US 6,986,222 B1
(45) Date of Patent: Jan. 17, 2006

(54) PLANTING RECEPTACLE ASSEMBLY AND A METHOD FOR PLANTING

(76) Inventor: Bradley Cochran, 907 Magnolia, Royal Oak, MI (US) 48073

( * ) Notice: Subject to any disclaimer, the term of this patent is extended or adjusted under 35 U.S.C. 154(b) by 0 days.

(21) Appl. No.: 10/357,802

(22) Filed: Feb. 4, 2003

(51) Int. Cl.
*A01G 9/02* (2006.01)

(52) U.S. Cl. .............................. 47/66.1; 47/86; 47/65.5; 47/33; 47/66.3; 47/65; 47/66.7; 52/12; 52/302.1; 52/52.16; 52/11; 119/61; 119/58; 119/61.1; 405/124; 405/43

(58) Field of Classification Search ............. 47/1.01 F, 47/1.01 T, 66.1, 73, 85, 86, 65.5, 65.9, 33, 47/66.3, 65, 66.4, 66.5, 66.7, 62 C, 32.7, 47/32.8, 68; 52/11, 12, 302.1, 52.16; 119/61, 119/58, 61.1, 61.31; D30/121; 405/124, 405/43

See application file for complete search history.

(56) References Cited

U.S. PATENT DOCUMENTS

| 84,002 A | 11/1868 | Ryder | |
|---|---|---|---|
| 180,277 A | 7/1876 | Schmitt | |
| 190,382 A * | 5/1877 | Snyder | 52/16 |
| 24,337 A | 5/1895 | Gilchrist | |
| 730,082 A | 6/1903 | Bates | |
| 1,191,184 A * | 7/1916 | Hooper | 119/61.1 |
| 1,373,883 A * | 4/1921 | Gray | 405/119 |
| 1,727,610 A * | 9/1929 | Kramer | 119/61.1 |
| 1,899,400 A | 2/1933 | Shaw | |
| 1,981,640 A | 11/1934 | Baker et al. | |
| 2,029,314 A | 2/1936 | Ellis | |
| 2,501,980 A * | 3/1950 | Hix | 220/4.33 |
| 2,552,051 A | 5/1951 | Margulies | |
| 2,857,862 A | 10/1958 | Dwyer | |
| 2,898,705 A | 8/1959 | Carlson | |
| 3,001,326 A | 9/1961 | O'Brien et al. | |
| 3,016,594 A | 1/1962 | Jacomaro | |
| 3,076,289 A | 2/1963 | Gallo | |
| 3,142,133 A | 7/1964 | Brooks | |
| 3,302,324 A | 2/1967 | MacDonald | |
| 3,302,326 A | 2/1967 | Maino | |
| 3,309,814 A | 3/1967 | Langley | |
| 3,355,895 A * | 12/1967 | Bayes et al. | 405/120 |
| 3,370,379 A * | 2/1968 | Gleason | 47/67 |
| 3,484,035 A | 12/1969 | Swett | |
| 3,552,634 A | 1/1971 | Ollier | |
| 3,707,806 A | 1/1973 | Toews et al. | |
| 3,734,279 A | 5/1973 | Fisher | |
| 3,744,183 A * | 7/1973 | Kato | 47/62 R |
| 4,018,338 A | 4/1977 | Lemkin | |
| D244,580 S | 6/1977 | Keough | |
| 4,120,119 A * | 10/1978 | Engel | 47/66.1 |
| 4,190,988 A * | 3/1980 | Carreiro | 52/16 |
| 4,205,485 A | 6/1980 | Olsen | |
| 4,213,274 A | 7/1980 | Skaife | |
| 4,244,486 A * | 1/1981 | Ewald, Jr. | 220/646 |
| 4,294,924 A | 10/1981 | Pepicelli et al. | |
| 4,306,376 A | 12/1981 | Strassacker et al. | |

(Continued)

FOREIGN PATENT DOCUMENTS

CA 2449327 * 8/2004

(Continued)

*Primary Examiner*—Peter M. Poon
*Assistant Examiner*—Andrea M. Valenti
(74) *Attorney, Agent, or Firm*—Law Offices of John Chupa & Associates, P.C.

(57) ABSTRACT

A planting assembly (10) including a flexible trough member (12) which may selectively form a plurality of members which may be then selectively interconnected in any desired manner.

5 Claims, 5 Drawing Sheets

U.S. PATENT DOCUMENTS

| | | | |
|---|---|---|---|
| 4,428,168 A | 1/1984 | Tomer | |
| 4,510,712 A | 4/1985 | Whitcomb | |
| 4,594,646 A | 6/1986 | Von Kohorn | |
| 4,631,859 A | 12/1986 | Letter et al. | |
| 4,697,703 A | 10/1987 | Will | |
| 4,785,578 A | 11/1988 | Grene | |
| 4,825,588 A * | 5/1989 | Norman | 47/66.1 |
| 4,988,302 A | 1/1991 | Smith et al. | |
| 5,022,183 A | 6/1991 | Bohlmann | |
| 5,044,120 A | 9/1991 | Couch | |
| 5,094,060 A | 3/1992 | Caird | |
| 5,103,587 A | 4/1992 | Holler | |
| 5,165,947 A | 11/1992 | Colucci et al. | |
| 5,199,213 A | 4/1993 | Krebs | |
| 5,203,109 A | 4/1993 | Simon et al. | |
| 5,409,510 A | 4/1995 | Houweling | |
| 5,438,796 A | 8/1995 | Nathan | |
| 5,695,057 A | 12/1997 | Sullivan | |
| 5,782,374 A | 7/1998 | Walker | |
| D409,909 S | 5/1999 | Hayes et al. | |
| 5,927,009 A | 7/1999 | Vanwingerden | |
| 5,953,859 A | 9/1999 | Cochran et al. | |
| 5,966,870 A * | 10/1999 | Michailiuk | 47/73 |
| 5,996,280 A * | 12/1999 | Michailiuk | 47/86 |
| 6,357,172 B1 * | 3/2002 | Risgaard et al. | 47/32.4 |
| 6,526,693 B2 | 3/2003 | Cochran et al. | |
| 6,837,002 B2 * | 1/2005 | Costa | 47/60 |
| 2002/0005012 A1 * | 1/2002 | Cochran | 47/66.5 |

FOREIGN PATENT DOCUMENTS

| | | | |
|---|---|---|---|
| GB | 2077800 A | * | 11/1980 |
| JP | 54143920 A | * | 11/1979 |

* cited by examiner

PLANTING RECEPTACLE ASSEMBLY AND A METHOD FOR PLANTING

FIELD OF THE INVENTION

The present invention generally relates to a planting receptacle assembly and to a method for planting and more particularly by way of example and without limitation to an assembly which may be used to selectively create complex planting designs in a relatively efficient manner and which further allows the design to remain stable by allowing the assembly to remain securely anchored into the ground.

BACKGROUND OF THE INVENTION

A planting assembly is typically used to receive one or more plants and is secured into the ground, thereby being effective to allow the contained plants to be growably deployed within a certain area, such as and without limitation a landscape "zone" or some other "pre-assigned" or pre-designated area. While prior planting assemblies do allow for the selective deployment of plants within or along a certain area or border, they suffer from some drawbacks.

First, by way of example and without limitation, these prior planting assemblies are formed from a relatively rigid material and have a relatively rigid linear structure. Hence, these prior planting assemblies are not readily useable to form intricate or accurate patterns, thereby substantially and undesirably limiting the types of designs or patterns which may be formed by use of the contained planting material. This is a significant drawback since one of the major motivations for using these prior planting assemblies is to provide an aesthetically pleasing overall appearance and this is largely achieved by the choice of the contained material (e.g., the color and texture of the growably contained planting material), as well as from the pattern that the assemblies respectively forms.

Secondly, by way of example and without limitation, these prior planting assemblies are not capable of being securely anchored into the ground. Thus, as ambient weather conditions change (e.g., as the soil conditions change) these planting assemblies become dislodged and create an undesirable and unaesthetically pleasing overall appearance. Further, these prior planting assemblies become easily dislodged from contact with landscapers or landscape implements (e.g., a lawnmower), thereby further and undesirably easily providing an unaesthetically overall appearance.

Thirdly, by way of example and without limitation, these prior planting assemblies do not generally distribute water or other liquid type of nutrients to the contained planting material, thereby requiring a relatively large amount of maintenance to the growably contained planting material.

The present invention overcomes these and other drawbacks in a new and novel manner.

SUMMARY OF THE INVENTION

It is a first non-limiting advantage of the present invention to provide a planting assembly which overcomes at least some of the previously delineated disadvantages of prior planting assemblies.

It is a second non-limiting advantage of the present invention to provide a method for planting which overcomes some or all of the previously delineated methods for planting which utilized prior planting assemblies.

It is a third non-limiting advantage of the present invention to provide a planting assembly which may be formed into substantially any desired shape and which is securely and selectively anchored into the ground.

According to a first non-limiting aspect of the present invention, a planting receptacle assembly is provided. Particularly, the planting assembly comprises a first flexible trough member having a generally semi-circular reception portion and a pair of protruding and curled lips which are longitudinally coextensive to said first flexible trough member and which are formed on opposed edges of said generally semi-circular reception portion; and a second flexible trough member which is substantially identical to said first flexible trough member and which is selectively and removably interconnected to said first flexible trough member.

According to a second non-limiting aspect of the present invention, a method for planting is provided. Particularly, the method includes the steps of forming a flexible trough having a first and a second end and a generally semi-circular reception portion; digging a trench in a desired shape; placing said flexible trough into said trench; forming a divot member; attaching said first end to said second end, effective to capture said divot member between said attached first and second ends; and anchoring said divot member within said trench, effective to anchor said flexible trough within said trench.

According to a third non-limiting aspect of the present invention, a method for planting is provided. Particularly, the method includes the steps of forming a flexible trough member having a generally semi-circular reception portion including a plurality of drainage holes, said flexible trough member further having a pair of opposed raised lips and a plurality of liquid emanation holes which are linearly coextensive to said pair of opposed raised lips and which reside above said generally semi-circular reception portion; cutting said flexible trough member into a pair of members; digging a first trench; placing a first of said pair of members into said first trench; digging a second trench which is nested in relation to said first trench; placing a second of said pair of members into said second trench; and coupling a first of said raised lips of said first of said pair of members with a first of said raised lips of said second of said pair of members; effective to couple said first of said pair of members to said second of said pair of members.

These and other features, aspects, and advantages of the present invention will become apparent from a reading of the following detailed description of the present invention and by reference to the following drawings.

BRIEF DESCRIPTION OF THE DRAWINGS

FIG. 13b is a perspective bottom view of a portion of the assembly which is shown in FIG. 13a.

DETAILED DESCRIPTION OF THE PREFERRED EMBODIMENT OF THE INVENTION

Figure 1:
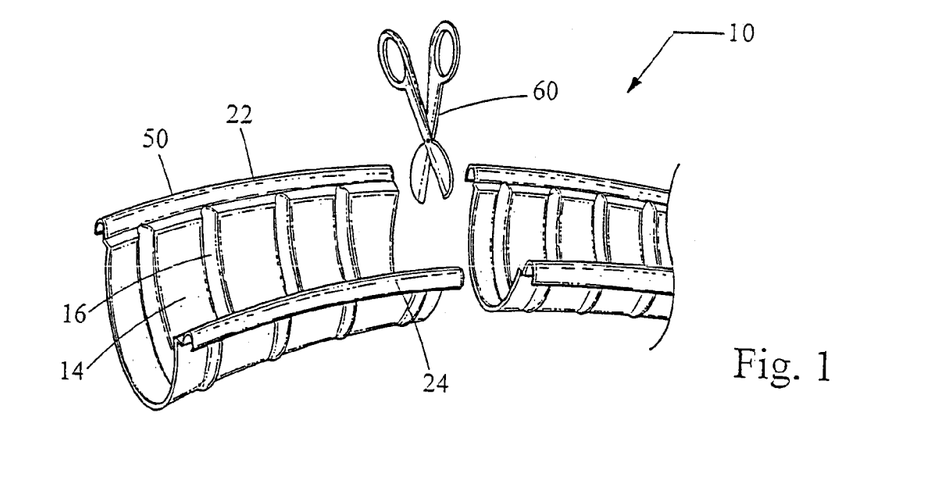
FIG. 1 is a partial perspective view of a planting assembly which is made in accordance with the teachings of the preferred embodiment of the invention being cut.
Figure 2:
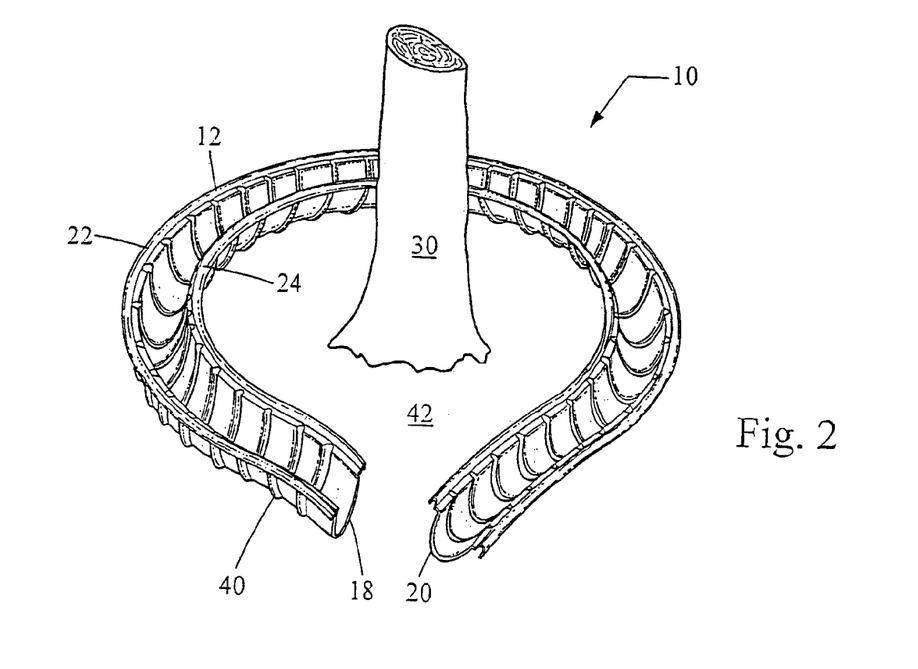
FIG. 2 is a partial perspective view of a planting assembly which is made in accordance with the teachings of the preferred embodiment of the invention being selectively deployed around a tree.
Figure 3:
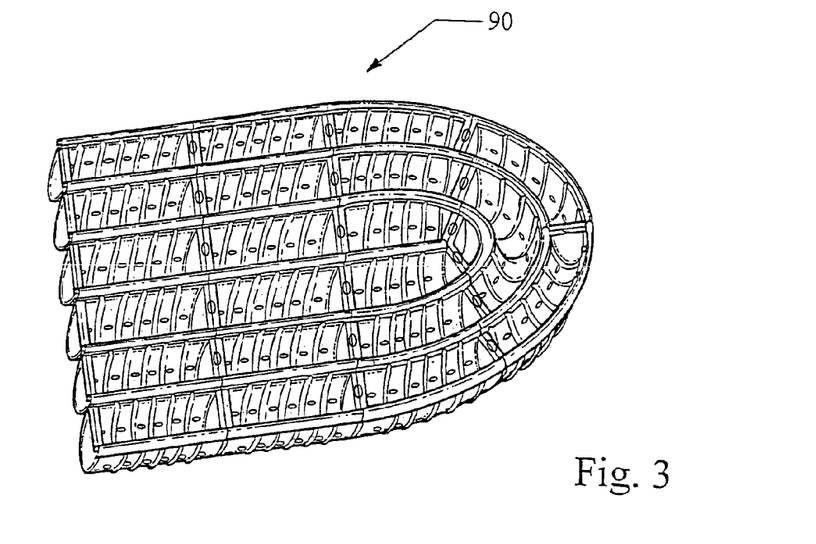
FIG. 3 is a top view of a planting assembly which is made in accordance with the teachings of a first alternate embodiment of the invention and being deployed in a desired manner.
Figure 4:
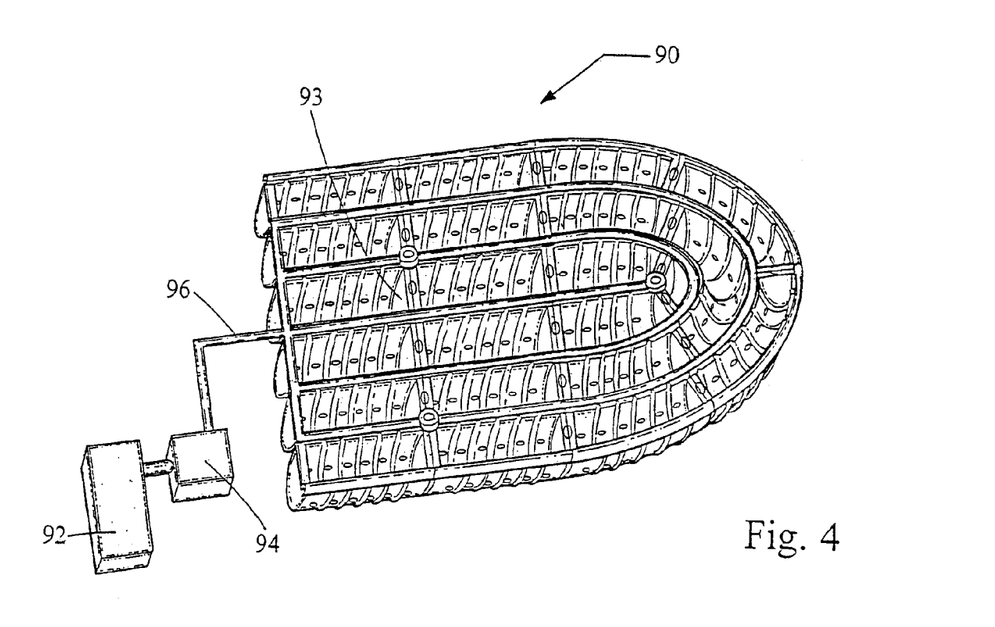
FIG. 4 is a view which is similar to that which is shown in FIG. 3 but further showing the selective interconnection of a source of liquid to the deployed planting assembly.

Referring now to FIGS. 1 and 2, there is shown a planting assembly 10 which is made in accordance with the teachings of the preferred embodiment of the invention.

As shown, planting assembly 10 comprises a very flexible trough member 12 having a generally semi-circular shaped planting reception portion 14 which includes integrally formed and equidistantly spaced strengthening ribs 16. In the most preferred embodiment of the invention, the trough member 12 is formed from a very soft plastic or composite type material, although other materials may be used in other non-limiting embodiments. The trough member 12 further has opposed and "open" ends 18, 20.

It should be appreciated that, in other non-limiting embodiments of the invention, the ribs 16 may be constructed from either a more flexible material than that which is used to construct the trough member 12 or be constructed to be thinner than the thickness of the trough member 12. In these other non-limiting embodiments, the ribs 16 are not used to strengthen or reinforce the trough member. Rather, the ribs 16 are employed to allow a certain degree of flexibility to the assembly 10, effective to allow the assembly 10 to be shaped in substantially any desired geometric planting design including, but not limited to arcuate geometrical configurations.

In yet other non-limiting embodiments of the invention, the material which is used to construct the trough member 12 may be substantially rigid. That is, in order to prevent damage from impact or contact to the trough member 12, the trough member 12 may be constructed to be substantially durable and to rely upon a more flexible material and/or thinner cross-section of the ribs 16 to effectuate a desired "bending" or pliability. That is, in this non-limiting embodiment, ribs 16 may be selectively compressed or stretched to permit the planting assembly 10 to bend.

As is further shown, the trough member 12 includes a pair of substantially identical and protruding curled lips 22, 24 which are linearly coextensive to the trough member 12 and which are operably deployed above the reception portion 14. It should be appreciated that these identical and protruding lips 22, 24 effectively define a desired geometrical configuration (i.e., the rounded lips 22, 24 create a raised and fluent outline of a desired geometrical configuration which may be easily differentiated from the ground surface in which the assembly 10 is disposed) and retard growth of undesirable foliage, such as weeds. The lips 22, 24 further prevent unsightly and undesirable mingling of desirable foliage contained within the assembly 10 and undesirable foliage which may be resident outside of the assembly 10 (i.e., the lips 22, 24 substantially prevent weeds from growing over the sides of the assembly 10 and germinating within the assembly 10, effective to obviate weeding or the removal of unwanted foliage within the assembly 10).

In one non-limiting embodiment of the invention, the trough member 12 is provided as a "one piece" roll of material and may be fully used to form a circle around an object, such as tree 30 or, due to its flexibility, it may be fully used to form substantially any other design required. That is, a trench, such as trench 40, may be formed in the ground 42. The trough member 12 is then inserted into the formed trench 40 and, end 18 is secured to end 20 by causing the top surface 50 of each of lips 22, 24 of the end 18 to respectively contact the undersurface 52 of the lips 22, 24 of the end 20. In this manner, the curled lips 22, 24 of the end 20 respectively, frictionally, selectively, and removably receive the curled lips 22, 24 of the end 18, thereby securing the trough member 12 within the formed trench 40. As shown best in FIG. 1, the trough member 12 may be selectively cut, with a pair of conventional scissors 60, to form several members which may be deployed in any desired manner. Further, it should be appreciated that drainage holes (not shown) may be formed in the containment portion 14, to facilitate the drainage of water and other liquid nutrients and materials which may be supplied to the contained plant material.

Figure 5:
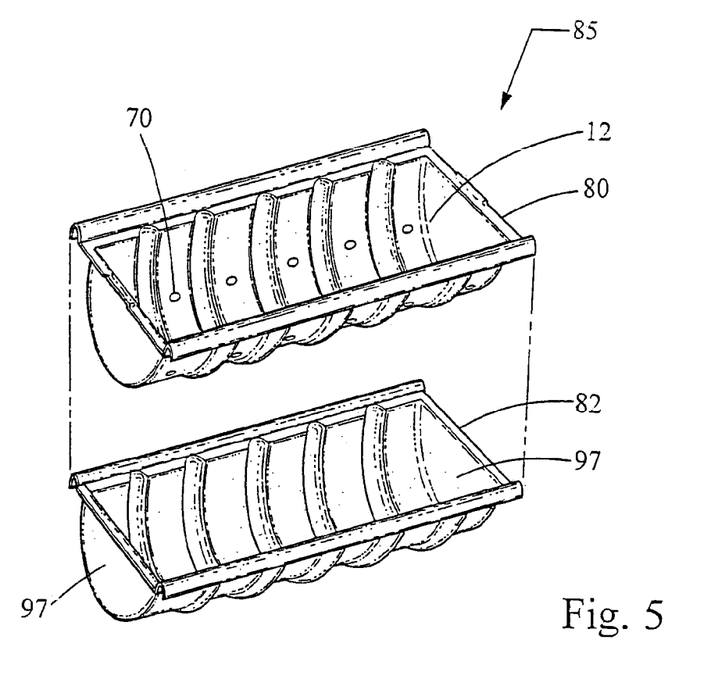
FIG. 5 is a perspective unassembled view of a planting assembly which is made in accordance with the teachings of a second alternate embodiment of the invention.
Figure 6:
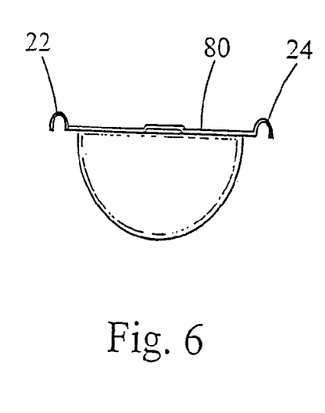
FIG. 6 is an end view of a portion of the assembly which is shown in FIG. 5.
Figure 7:
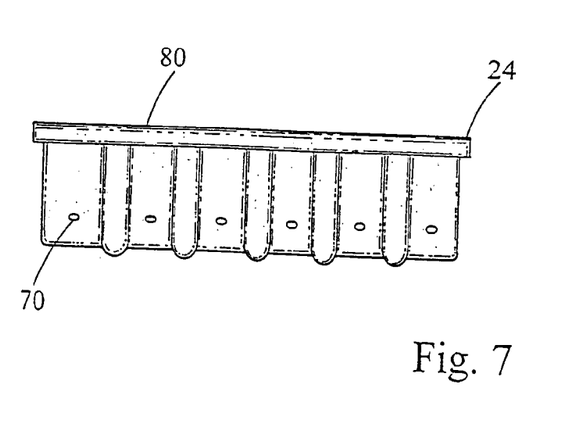
FIG. 7 is a side view of a portion of the assembly which is shown in FIG. 5.

In one alternate embodiment of the invention, as shown best in FIGS. 5–7, closed planting members 80, 82 may be provided. Particularly, each of the members 80, 82 is substantially similar to the trough member 12 except that respective ends 18, 20 are "closed" ends 97, 99. As shown, member 80 further includes drainage holes 70 in the plant containment portion 14 and is adapted to be selectively received by and within the member 82, thereby forming a planting assembly 85.

In yet another alternate embodiment of the invention, as shown best in FIGS. 3–6, separate planting assemblies 85 may be selectively connected, by the use of curled lips 22, 24 of members 80 to form a nestled arrangement 90 and a source of water and/or other liquid nutrients 92 may be coupled to a pump and controller assembly 94. This assembly 94 is then coupled, by the use of pipe or conduit 96, to one of the assemblies 85. In this nestled arrangement, each of the members 82 is communicatively coupled to each of the other members 82 due to the use of orifices 93 within each end wall 97, 99. Further, as shown, the pipe or conduit 96 terminates within one of the end walls 97 and the controller 94 selectively dispenses the liquid, from source 92, to all of the members 82, thereby automatically providing the liquid material to all of the contained plant material.

Figure 8:
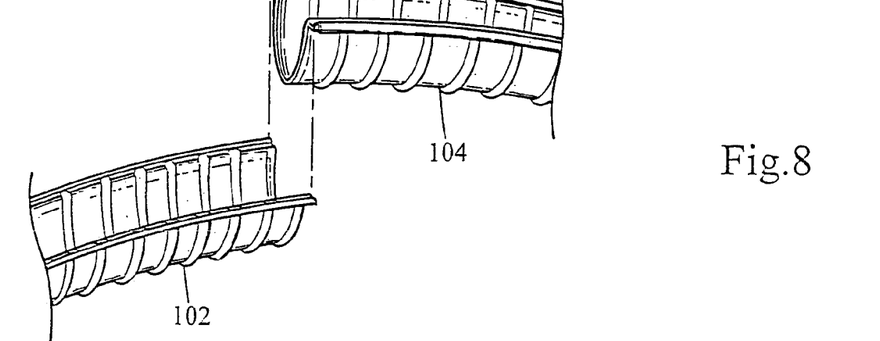
FIG. 8 is perspective unassembled view of two portions of the planting assembly of the preferred embodiment of the invention being selectively interconnected.
Figure 9:
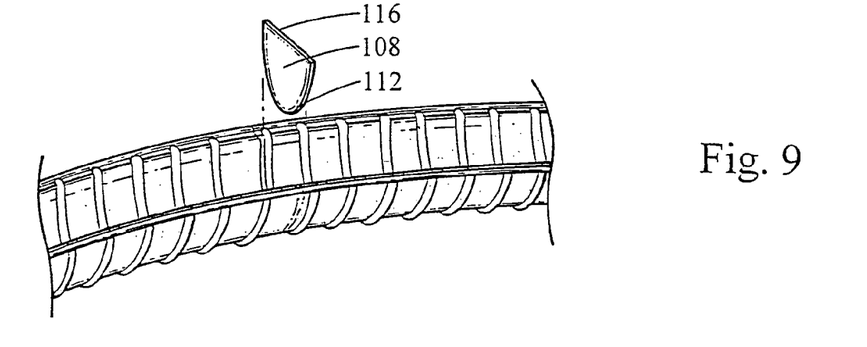
FIG. 9 is a perspective view of two interconnected portion of the planting assembly of the preferred embodiment of the invention in unassembled combination with a divot member.
Figure 12:
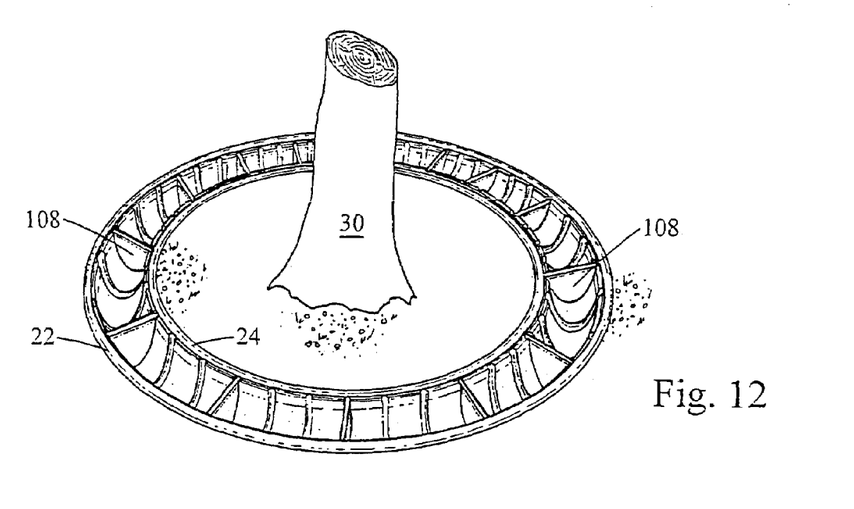
FIG. 12 is a perspective view of an alternate deployment of the planting assembly of the preferred embodiment of the invention around a tree and utilizing divot members.

Referring now to FIGS. 8 and 9, there is shown yet another alternative embodiment of the present invention. Particularly, as shown, members 102, 104, which may be formed from trough member 12, may be interconnected by the use of a divot member 108. Particularly, the divot member 108 is, in the most preferred embodiment of the invention, shaped in the form of a shoe heel and has a generally semi-circular portion 112 which may be selectively placed into the ground. The linear portion or edge 116 may be contained between the ends 18, 20 of interconnected members and frictionally secured within the curled lips 22, 24 which overlay the received end 18, 22. The divot member 108 thereby further secures the members 102, 104 in the ground. As shown best in FIG. 12, these divot members 108 may be placed at each connection of members 102, 104.

Figure 10:
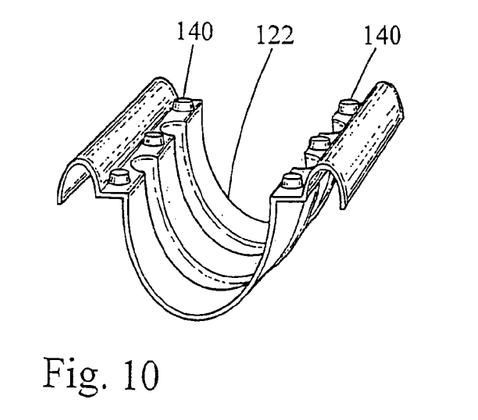
FIG. 10 is a perspective top view of a portion of a planting assembly which is made in accordance with the teachings of a third alternate embodiment the assembly.
Figure 11:
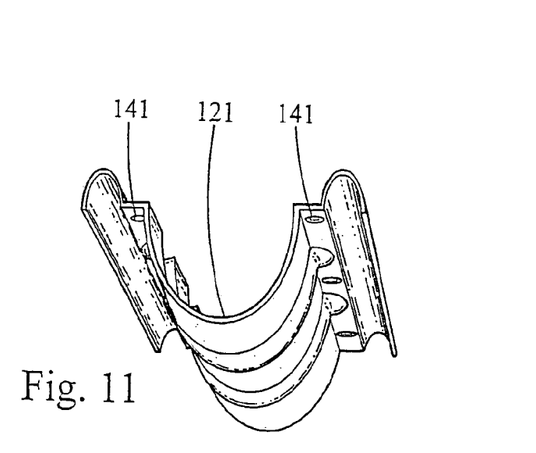
FIG. 11 is a perspective bottom view of a portion of the assembly which is shown in FIG. 10.

In yet another non-limiting embodiment of the invention, a member 122 may be formed and is substantially identical to members 102, 104 with the exception of the inclusion of raised and hollow fastening portions 140 which are above the planting reception portion 14 and linearly coextensive to the protruding curled lips 22, 24. In this manner, substantially any desired length of a member 122 may be formed, cut, and frictionally fastened to the underside of another formed and cut member 122. That is, the raised fastening portions 140 are designed to frictionally fit within the hollow portions 141 of the raised portions 140, thereby securely linking two separate and distinct members 122, effective to allow substantially any desired geometrical configuration to be realized.

Figure 13A:
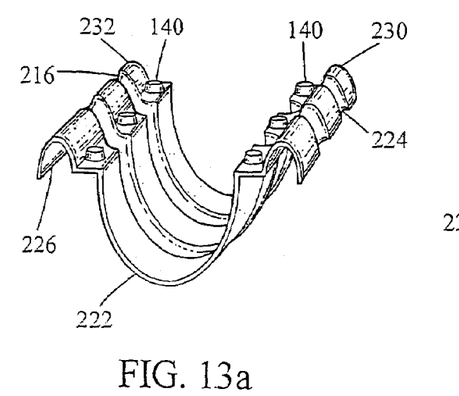
FIG. 13a is a perspective view of a portion of a planting assembly which is made in accordance with the teachings of a fourth alternate embodiment of the assembly.
Figure 13B:
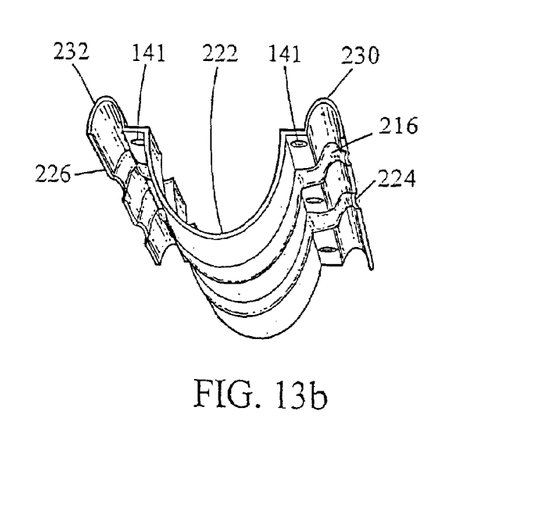

Referring now to FIGS. 13a and 13b, there is shown an alternate embodiment of the assembly 10. As shown, the members 222 are substantially similar to the members 122 with the exception that the members 222 include ribs 216 which traverse the entire members 222. That is, the ribs 216 are not limited to only traverse the trough portion 14, as shown in FIGS. 1–12. Rather, as can best be seen in FIGS. 13a and 13b, the ribs are continuous from the outside edge 224 of the lip 230 to the outside edge 226 of the lip 232. It should be appreciated that, in this alternate embodiment, the flexibility of the members 222 may be retained in substantially any desired position, thereby further allowing the members 222 to be placed or "bent" into substantially any desired geometrical configuration, as well as allowing for the continuity of the desired geometrical configuration.

It is to be understood that the invention is not limited to the exact construction or method which is illustrated and discussed above, but that various changes and modifications may be made without departing from the spirit and the scope of the inventions as are more fully described in the following claims.

What is claimed is:

1. A planting receptacle assembly comprising a generally semi-circular planting reception portion;
a pair of substantially identical flat ledges which are each linearly coextensive to said planting reception portion, which are respectively disposed on opposed sides of said generally semi-circular planting reception portion, and which lie in the same plane which overlays said generally semi-circular planting reception portion, and wherein said generally semi-circular planting reception portion further includes a first and second curled portion which respectively terminate upon and are respectively and linearly coextensive to said first and second ledges, each of said first and second curled portions being deployed above said planting reception portion and being "u" shaped with a respective interior portion which is parallel to a unique one of said opposed sides; and a second flexible trough member having a generally semi-circular planting reception portion, a pair of substantially identical flat ledges which are each linearly coextensive to said planting reception, which are respectively disposed on opposed sides of said generally semi-circular planting reception portion, and which generally lie in the same plane which overlays said generally semi-circular planting reception portion, said second flexible trough member further including a first and a second curled portion which respectively terminate upon and are respectively and linearly coextensive to said first and second ledges, each of said first and second curled portions being deployed above said planting reception portion and being "u" shaped with a respective interior portion which is parallel to a unique one of said opposed sides, wherein said first curled portion of said second flexible trough member is wholly received within the interior of said first curled portion of said first flexible trough member and is linearly coextensive to said first flexible trough member, thereby coupling said first flexible trough member to said second flexible trough member and forming said planting receptacle assembly.

2. A planting receptacle assembly comprising a first flexible trough member having a generally semi-circular planting reception portion, a pair of substantially identical flat ledges which are each linearly coextensive to said planting reception portion and which are respectively disposed on opposed sides of said generally semi-circular planting reception portion, said first flexible trough member further including a first and a second curled lip portion which respectively terminate upon and are respectively and linearly coextensive to said first and said second ledges, each of said first and second curled portions being deployed above said planting reception portion and being "u" shaped, wherein said planting reception portion further includes a plurality of equidistantly spaced, substantially similar, and "u" shaped stiffening ribs; and wherein said planting reception assembly further includes a second flexible trough member having a generally semi-circular planting reception portion, a pair of substantially identical flat ledges which are each linearly coextensive to said planting reception portion and which are respectively disposed on opposed sides of said generally semi-circular planting reception portion, said second flexible trough member further including a first and a second curled portion which respectively terminate and are respectively and linearly coextensive to said first and second ledges, each of said first and second curled portion being deployed above said planting reception portion and being "u" shaped, wherein said planting reception portion further includes a plurality of equidistantly spaced, substantially similar, and "u" shaped stiffening ribs, and wherein said first curled portion of said second flexible trough member is wholly and selectively received within and is linearly coextensive to said first curled portion of said first flexible trough member, thereby coupling said first flexible trough member to said second flexible trough member and forming said planting receptacle assembly.

3. The planting receptacle assembly of claim 2 further comprising a plurality of first drainage holes within said planting reception portion of said first flexible trough member; and a plurality of second drainage holes within said planting reception portion of said second flexible trough member.

4. The planting receptacle assembly of claim 2 wherein said stiffening ribs which are located within said planting reception portion of said first flexible trough member each extend to said pair of flat ledges of said first flexible trough member; and wherein said stiffening ribs which are located within said planting reception portion of said second flexible trough member each extend to said pair of flat ledges of said second flexible trough member.

5. The planting receptacle assembly of claim 4 further comprising a third flexible trough member which is substantially identical to said first flexible trough member; and a heel shaped divot member having a broad end which is received in said curled portions of said first flexible trough member and which is coupled to the first and second curled portion of said third flexible trough member by said curled portions; and a semi-circular portion which is selectively placed in the ground, thereby allowing said coupled first and third flexible trough members to be secured to the ground.

* * * * *